United States Patent [19]

Hedin et al.

[11] Patent Number: 4,600,270
[45] Date of Patent: Jul. 15, 1986

[54] BEAM RECOMBINATION VIA CYLINDRICAL MIRROR

[75] Inventors: Raymond C. Hedin, Apple Valley; Samuel A. Meddaugh, Eagan; Ernest J. Torok, Minneapolis, all of Minn.

[73] Assignee: The United States of America as represented by the Secretary of the Air Force, Washington, D.C.

[21] Appl. No.: 603,795

[22] Filed: Apr. 25, 1984

[51] Int. Cl.⁴ .................. G02B 27/44; G02B 3/04
[52] U.S. Cl. .............................. 350/162.17; 350/433; 350/443; 350/355
[58] Field of Search ............... 350/442, 443, 444, 446, 350/433, 162.17, 162.23, 162.24, 355, 377, 375, 376; 356/354

[56] References Cited

U.S. PATENT DOCUMENTS

| | | | |
|---|---|---|---|
| 2,374,003 | 4/1945 | Eckel | 350/442 |
| 2,492,461 | 12/1949 | Bouwers | 350/442 |
| 2,504,383 | 4/1950 | Bouwers et al. | 350/442 |
| 2,563,433 | 8/1951 | Taylor | 350/442 |
| 2,608,129 | 8/1952 | Taylor | 350/442 |
| 2,793,564 | 5/1957 | Bouwers et al. | 350/442 |
| 3,001,446 | 9/1961 | Bouwers et al. | 350/442 |
| 3,110,752 | 11/1963 | Becker | 350/442 |
| 4,281,905 | 8/1981 | Harvey et al. | 350/377 |

Primary Examiner—John K. Corbin
Assistant Examiner—Bruce S. Shapiro
Attorney, Agent, or Firm—Donald J. Singer; Stanton E. Collier

[57] ABSTRACT

A beam recombiner is used to parallelize two first order beams emanating from an magneto-optic stripe domain light deflector. One arrangement uses a concave cylindrical mirror with a negative meniscus lens attached thereon to redirect a conjugate beam. The other arrangement uses a concave cylindrical mirror with a cylindrical rod lens placed at the radius of curvature of the mirror to redirect the conjugate beam.

8 Claims, 3 Drawing Figures

BEAM RECOMBINATION VIA CYLINDRICAL MIRROR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to means of forming laser beams, and, more particularly, relates to a means for combining divergent congugate laser beams.

The laser beam of this invention is directed at a conventional magneto-optic stripe domain light deflector which is a phase diffraction grating such that both the grating constant and the orientation can be altered by application of an external magnetic field. The diffraction grating consists of a ferri- or ferro-magnetic film containing stripe domains which by virtue of the Faraday effect act as a diffraction grating. Both the orientation and spatial periodicity of the stripe domains can be controlled by application of a magnetic field from external coils. The deflector is two dimensional, fast and very wide angle. It has many applications including displays, optical radar, communications, multi-target designation and tracking, reconnaissance, non-impact printing, etc. When a laser beam impinges on the stripe domain phase grating backed by a mirror, two beams of equal intensity emerge in the two first order diffraction angles. As a result, the two beams go in different directions and unless a beam combiner is used, the energy in the conjugate beam is wasted.

In the apparatus shown in the G. F. Sauter, et al, U.S. Pat. No. 4,148,556 there is illustrated a magneto-optic light deflection system that utilizes the magnetic film diffraction grating of the E. J. Torok, et al, U.S. Pat. No. 3,752,563, but in which the light is transmitted by optical fiber transmission lines. In this magneto-optic light deflection system, a light beam is directed normally incident to the first surface of the magnetic film by an input optic fiber and is coupled to selected ones of output optic fibers on the second and opposite surface of the magnetic film by applying the desired magnetic fields to the magnetic film. Conjugate reflected light beams are, via their associated output optic fibers, added together by an optic coupler to provide a single output fiber having the sum of the light intensity in both of the associated output fibers.

The use of optic fibers causes line losses and restrictions due to the use of optic fiber transmission lines.

In the apparatus shown in Harvey et al, U.S. Pat. No. 4,281,905 the magneto-optic light deflector system includes two converging half-lenses of equal focal lengths, that may be formed from a single circular converging lens, a circular center portion may be removed and which then may be cut in half along a diameter. The two converging half-lenses are oriented: superposed with their optical axes common and orthogonal to the plane of the magneto-optic light deflector; with their optical axes aligned with that of the optical axis of the light beam that is directed normally incident to the plane of the magneto-optic light deflector; with the two converging half-lenses separated from each other by a distance equal to twice the focal length of a single converging half-lens; and the converging half-lens located nearest the plane of the magneto-optic light deflector may be separated from the magneto-optic light deflector by a distance equal to the focal length of a single converging half-lens. An additional converging lens may be oriented in the optical axis of the parallelized conjugate light beams with its optical axis parallel thereto for focusing the two parallelized conjugate light beams upon a screen or detector that is located at the converging lens's focal plane.

The problems associated with the lens recombination device are the lens aberation and the correct positioning of the lens, five degrees of freedom per lens.

These drawbacks have motivated the search for alternative devices that minimizes the problems noted above.

SUMMARY OF THE INVENTION

The present invention sets forth beam recombination devices that utilize primarily cylindrical mirrors.

The preferred embodiment utilizes a concave cylindrical mirror having a reflective surface on the concave side. Further attached to the concave side is a negative meniscus lens that causes the conjugate beam, emitted from the stripe domain reflector, to be made parallel with the primary beam. The conjugate beam and the primary beam are the first order beams. Other means are feasible to combine the parallel beams to be congruent if so required.

The second embodiment again uses the concave cylindrical mirror having the reflective coating on the concave side and in substitution for the meniscus lens uses a solid cylindrical glass rod positioned along the center line of the concave mirror. This device also causes the conjugate beam to be made parallel to the primary beam.

One object of the present invention is a beam recombination device that utilizes virtually all of the available 180° field of view.

Another object of the present invention is a beam combination device that minimizes the critical alignment parameters; and Another object of the present invention is a beam recombination device that has virtually no aperture and acceptance angles limitations.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
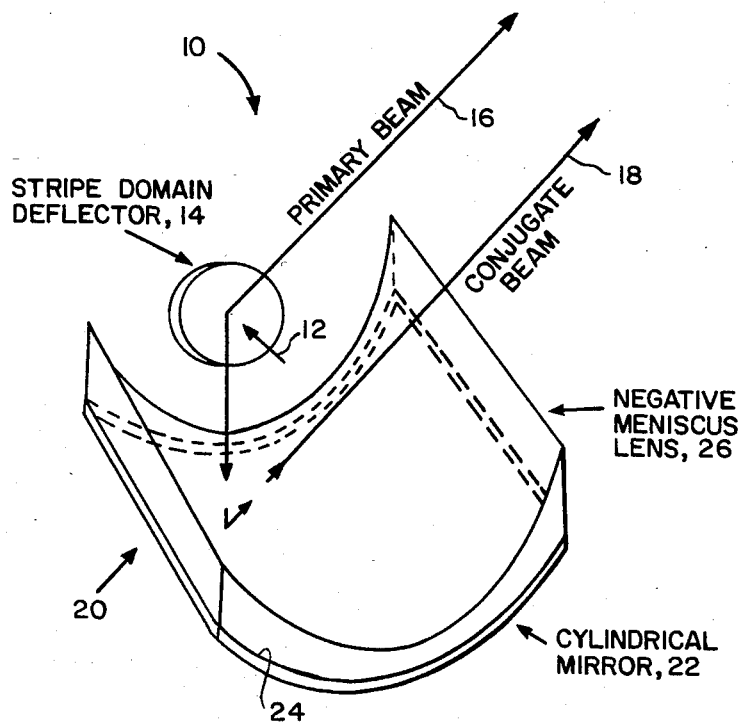
FIG. 1 illustrates beam recombination with a cylindrical mirror and a meniscus lens of the present invention.

Referring to FIG. 1, a beam recombiner 10 is illustrated and includes a laser, not shown, that emits a laser beam 12 at a stripe domain light deflector 14. From deflector 14, a primary beam 16 and a conjugate beam 18, first order beams, are emitted. A conjugate beam reflector 20 is positioned to receive conjugate beam 18 and to reflect conjugate beam 18 so that it is parallel to primary beam 16.

Reflector 20 includes a concave cylindrical mirror 22 having a reflecting coating, not shown, on a concave side 24. Upon concave side 24 is further placed a negative meniscus lens 26 which corrects conjugate beam 18 upon reflection from concave side 24 so that beams 16 and 18 are parallel for different acceptance angles. Beams 16 and 18, once made parallel, can be combined into one beam, not shown, by such means as a large lens placed near reflector 20. This means is illustrated in Harvey et al, U.S. Pat. No. 4,281,905.

The angle of deflection of beam 16 from the plane of the film is varied by varying the intensity of a DC field in the plane of the film or by varying the intensity of the DC field normal to the plane of the film. The orientation of the stripe domains is varied by varying the direction of the DC field in the plane of the film while the film hystersis is overcome by an AC tickle field that is oriented perpendicular to the stripe domains. The normally incident beam 12 is diffracted by the film-forming diffraction grating to generate a single zeroth order light beam, not shown, which is oriented along the optical axis of the normally incident light beam, and a pair of first order light beams, which are beams 16 and 18 that are deflected along the new optical axes. One of the first order light beams is called the primary beam 16, while the other is called the conjugate beam 18, each of the first order light beams contain 50% of the total deflected light intensity that is directed along the two conjugate optical axes.

Still referring to FIG. 1, in order to eliminate beam 18 convergence introduced by cylindrical mirror 22, a diverging meniscus lens 26 is put in contact with concave side 24 of mirror 22. The dimensions of the required meniscus lens 26 can be approximated using the lens maker's formula for thick lens:

$$\frac{1}{f} = (n-1)\left[\frac{1}{r_1} - \frac{1}{r_2} + \frac{t(n-1)}{r_1 r_2 n}\right] \quad (1)$$

where f is the focal length of meniscus lens 26, t is the thickness of lens 26 and $r_1$ and $r_2$ are the radii of curvatures for the two lens surfaces. R is set equal to the radius of curvature of mirror 22. The focal length of mirror 22 is R/2, thus $r_2 = R$. The focal length of lens 26 must be twice the focal length of mirror 22 because the light must make two passages through lens 26. Thus the lens maker's equation states:

$$r_1 = \frac{R(n-1)}{n} + t\left(\frac{(n-1)}{n}\right)^2 \quad (2)$$

If heavy flint glass is used with n=1.65 and t=R/10 then $r_1/R = 0.409$.

Lens 26 can be made segmented in order to reduce the glass thickness at the edges of lens 26. Furthermore, molded optics are probably acceptable in most applications.

Figure 2A:
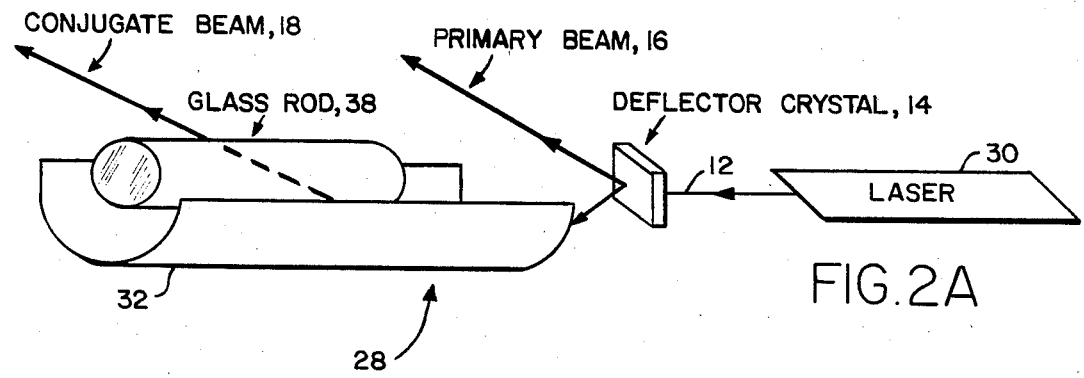
FIG. 2A illustrates beam recombination with a cylindrical mirror and a cylindrical rod lens of the present invention.
Figure 2B:
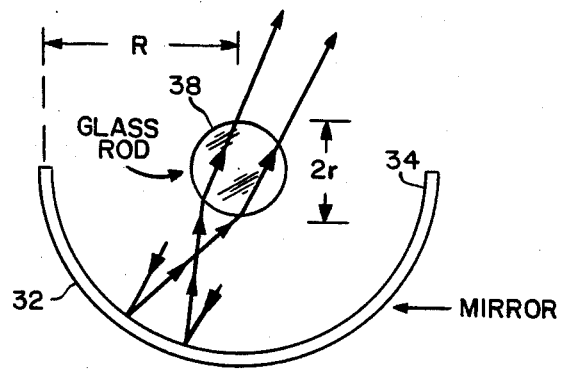
FIG. 2B illustrates an end view of the device of FIG. 2A.

Referring to FIGS. 2A and 2B, an alternative preferred embodiment is shown. An alternative beam recombiner 28 has a laser 30 outputting a beam 12 at deflector 14. Output from deflector 14 is primary and conjugate beam 16 and 18. A concave cylindrical mirror 32 has a reflective coating on an inside surface 34. A transparent cylindrical rod lens 38 acts as a converging lens and is placed at the axis of cylindrical mirror 32. This arrangement has the advantages of cylindrical symmetry so that beam 18 at all angles receives equal treatment. Rod lens 38 and mirror 32 share a common cylindrical focal plane and each has a focal length of R/2. The radius, r, of rod lens 38 can be approximated from the lens maker's equation such that $$\frac{1}{R/2} = (n-1)\left[\frac{1}{r} + \frac{1}{r} - \frac{2r(n-1)}{r^2 n}\right] \quad (3)$$

or $$\frac{r}{R} = \frac{n-1}{n} \quad (4)$$

If a low refractive index glass is used for rod lens 38 with n=1.45 then r/R=0.31. As a part of this design, minimizing r/R maximizes the acceptance angle by preventing rod lens 38 from interfering with entering beam 18; it is also seen that rod lens 38 can not be too close to deflector 14 because this would interfere with beams 16 and 18 leaving deflector 14.

The above beam recombination devices can be used in optical tracking and guidance system.

Clearly, many modifications and variations of the present invention are possible in light of the above teachings and it is therefore understood, that within the inventive scope of the inventive concept, the invention may be practiced otherwise than specifically claimed.

What is claimed is:

1. A beam recombination device, said beam recombination device comprising:
   means for producing a collimated beam;
   a diffraction grating, said grating receiving said beam and outputting two first order beams along conjugate axes, one of said first order beams being a primary beam and the other being a conjugate beam; and
   means for causing said conjugate beam to be parallel to said primary beam, said means for causing comprising a concave cylindrical mirror and a negative meniscus lens attached to said mirror, said meniscus lens having a concave surface with a radius $r_1$ defined by the following equation $$r_1 = R\frac{(n-1)}{n} + t\left(\frac{n-1}{n}\right)^2$$

where R is equal to the radius of curvature of said mirror and a convex surface of said meniscus lens in contact with said mirror, t is the thickness of said meniscus lens, and n is the index of refraction of said meniscus lens, a longitudinal axis of said cylindrical mirror being identical with a diffraction grating optical axis being coincident with said collimated beam of said means for producing, said means for causing being located in a lower half of a field of view of said diffraction grating.

2. A beam recombination device as defined in claim 1, said device further including means for collimating into one beam said primary beam and said conjugate beam made parallel to said primary beam.

3. A beam recombination device as defined in claim 1 wherein said means for producing a collimated beam is a laser.

4. A beam recombination device as defined in claim 1 wherein said diffraction grating is a magneto-optic stripe domain light deflector.

5. A beam recombination device, said beam recombination device comprising:

means for producing a collimated beam;

a diffraction grating, said grating receiving said beam and outputting two first order beams along conjugate axes, one of said first order beams being a primary beam and the other being a conjugate beam; and means for causing said conjugate beam to be parallel to said primary beam, said means for causing comprising a concave cylindrical mirror and a cylindrical rod lens separated from said mirror, said rod lens having a longitudinal axis identical with a longitudinal axis of said mirror and having a radius of curvature defined by the following equation:

$$\frac{r}{R} = \frac{n-1}{n}$$

where R is equal to the radius of curvature of said mirror, r is the radius of curvature of said rod lens, and n is the index of refraction of said rod lens.

6. A beam recombination device as defined in claim 5, said device further comprising means for collimating into one beam said primary beam and said conjugate beam made parallel to said primary beam.

7. A beam recombination device as defined in claim 5 wherein said means for producing a collimated beam is a laser.

8. A beam recombination device as defined in claim 5 wherein said diffraction grating is a magneto-optic stripe domain light deflector.

* * * * *